United States Patent [19]

Tachibana et al.

[11] Patent Number: 5,509,001
[45] Date of Patent: Apr. 16, 1996

[54] APPARATUS AND METHOD FOR CONTROLLING CELLS INPUT TO ATM NETWORK

[75] Inventors: Tetsuo Tachibana; Eisuke Iwabuchi, both of Kawasaki, Japan

[73] Assignee: Fujitsu Limited, Kawasaki, Japan

[21] Appl. No.: 394,205

[22] Filed: Feb. 24, 1995

Related U.S. Application Data

[63] Continuation of Ser. No. 119,599, Sep. 13, 1993, abandoned, which is a continuation of Ser. No. 779,178, Oct. 18, 1991, abandoned.

[51] Int. Cl.[6] .................................................. H04J 3/14
[52] U.S. Cl. ...................... 370/17; 370/60.1; 370/79; 370/94.2
[58] Field of Search .......................... 370/17, 60, 60.1, 370/79, 94.1, 94.2

[56] References Cited

U.S. PATENT DOCUMENTS

| | | | |
|---|---|---|---|
| 4,964,119 | 10/1990 | Endo et al. | 370/94.1 X |
| 5,007,043 | 4/1991 | van den Dool et al. | 370/94.1 X |
| 5,007,048 | 4/1991 | Kowalk | 370/94.1 X |
| 5,014,260 | 5/1991 | Wicklund | 370/94.1 X |
| 5,140,588 | 8/1992 | Danner | 370/94.1 |

FOREIGN PATENT DOCUMENTS

| | | | |
|---|---|---|---|
| 0293314 | 11/1988 | European Pat. Off. | H04L 11/20 |
| 0310173 | 4/1989 | European Pat. Off. | H04L 11/20 |
| 0366635 | 5/1990 | European Pat. Off. | H04L 5/22 |
| 0381275 | 8/1990 | European Pat. Off. | H04L 12/56 |
| 0384758 | 8/1990 | European Pat. Off. | H04L 12/56 |
| 0383660 | 8/1990 | European Pat. Off. | H04L 12/56 |
| 0387958 | 9/1990 | European Pat. Off. | H04L 12/56 |

OTHER PUBLICATIONS

Dennissen et al., "The Policing Function in an ATM network", 1990 International Zurich Seminar on Digital Communications, Mar. 5, 1990, pp. 131–144.

Kowalk, W., "The 'Policing Function' to Control User Access in ATM networks.", The International Symposium on Subcriber Loops and Services, Sep. 11, 1988, pp. 240–245.

European Search Report, The Hague, Sep. 29, 1994.

Primary Examiner—Douglas W. Olms
Assistant Examiner—Russell W. Blum
Attorney, Agent, or Firm—Staas & Halsey

[57] ABSTRACT

An apparatus for controlling cells which are to be input to an ATM switch includes a buffer circuit for storing a cell directed to the ATM switch, and a memory for storing, for each of different calls, the number of cells which are in the ATM switch. The apparatus includes a periodic calculation circuit for periodically changing the number of cells for each of the different calls by an operation value, and a control part for determining whether the cell stored in the buffer circuit should be output to the ATM switch or discarded by referring to the number of cells which is stored in the memory and related to the cell stored in the buffer circuit.

33 Claims, 18 Drawing Sheets

APPARATUS AND METHOD FOR CONTROLLING CELLS INPUT TO ATM NETWORK

CROSS REFERENCE TO RELATED APPLICATIONS

This application is a continuation of 08/119,599, filed Sept. 19, 1993, which is a continuation of 07/779,178, filed Oct. 18, 1991, both abandoned and is related to application Ser. No. 07/780,121, now abandoned.

BACKGROUND OF THE INVENTION

1. Field of the Invention

The present invention generally relates to ATM (Asynchronous Transfer Mode) networks, and more particularly to an apparatus and method for controlling cells which are input to an ATM network.

2. Description of the Prior Art

Recently, there has been considerable activity in the development of high-speed communication networks capable of handling a large amount of data. One of such high-speed communication networks is an ATM network.

A subscriber (terminal) requests a band (frequency range) used by the subscriber to the ATM network when setting up a call. In response to this request, the ATM network calculates a necessary band based on the requested band, and determines, on the calculated band, whether or not the call from the subscriber should be permitted. If the number of cells which are input to the ATM network greatly deviates from the number of cells corresponding to the requested band due to an evil intention or an unexpected matter, some of the input cells will be frequently destroyed in the ATM network. This will affect other calls transferred via the ATM network.

In order to eliminate the above problem, a supervisory device is provided at a subscriber interface unit of the ATM network. Referring to FIG. 1, an ATM exchange 10 includes a subscriber interface unit 13 and an ATM switch 14. The subscriber interface unit 13 is composed of a subscriber line terminating unit 11 and a cell input control unit 12. The cell input control unit 12, which corresponds to the above-mentioned supervisory device, discards input cells if the number of input cells greatly deviates from the requested number of cells. The cell input control unit 12 monitors the number of input cells which are supplied to the ATM switch 14. When the number of input cells is smaller than the requested number of cells, the cell input control unit 12 transfers the input cell from the subscriber line terminating unit 11 to the ATM switch 14.

The cell input control unit 12 operates in the following manner. The cell input control unit 12 includes a counter, which increases the counter value by "1" each time one input cell is received. The counter value in the counter decreases by "1" each time a predetermined time elapses. When the counter value exceeds a predetermined threshold value, the input cell is discarded. The above operation can be written as follows:

$$FA(t)=G(t)-INT(t/T) \quad (1)$$

where FA(t) denotes the counter value, INT(X) is a function of omitting the numbers on the right side of the decimal point, G(t) denotes the number of input cells obtained during time t, and T is a period at which the counter value FA(t) is decreased by "1". When FA(t) <α (α is a tolerable value), the input cell is permitted to be input to the ATM switch 14. When FA(t) >α, the input cell is discarded.

In general, the ATM network has a characteristic such that a plurality of calls exist in one interface. However, the conventional cell input control unit 12 is not designed to process a plurality of calls in one channel.

SUMMARY OF THE INVENTION

An object of the present invention is to provide an apparatus and method capable of processing cells related to a plurality of calls in each channel.

This object of the present invention is achieved by an apparatus for controlling cells which are to be input to an ATM switch, the apparatus comprising: buffer means for storing a cell directed to the ATM switch; first memory means for storing, for each of different calls, the number of cells which are in the ATM switch; periodic calculation means, coupled to the first memory means, for periodically changing the number of cells for each of the different calls by an operation value; and control means, coupled to the first memory means, for determining whether the cell stored in the buffer means should be output to the ATM switch or discarded by referring to the number of cells which is stored in the first memory means and related to the cell stored in the buffer means.

The above object of the present invention is also achieved by a method for controlling cells which are to be input to an ATM switch, the method comprising the steps of: (a) storing a cell directed to the ATM switch in a buffer memory; (b) storing, for each of different calls, the number of cells which are in the ATM switch in a first memory; (c) periodically changing the number of cells for each of the different calls by an operation value; and (d) determining whether the cell stored in the buffer memory should be output to the ATM switch or discarded by referring to the number of cells which is stored in the first memory and related to the cell stored in the buffer memory.

BRIEF DESCRIPTION OF THE DRAWINGS

Other objects, features and advantages of the present invention will become apparent from the following detailed description when read in conjunction with the accompanying drawings, in which.

DESCRIPTION OF THE PREFERRED EMBODIMENTS

Figure 2:
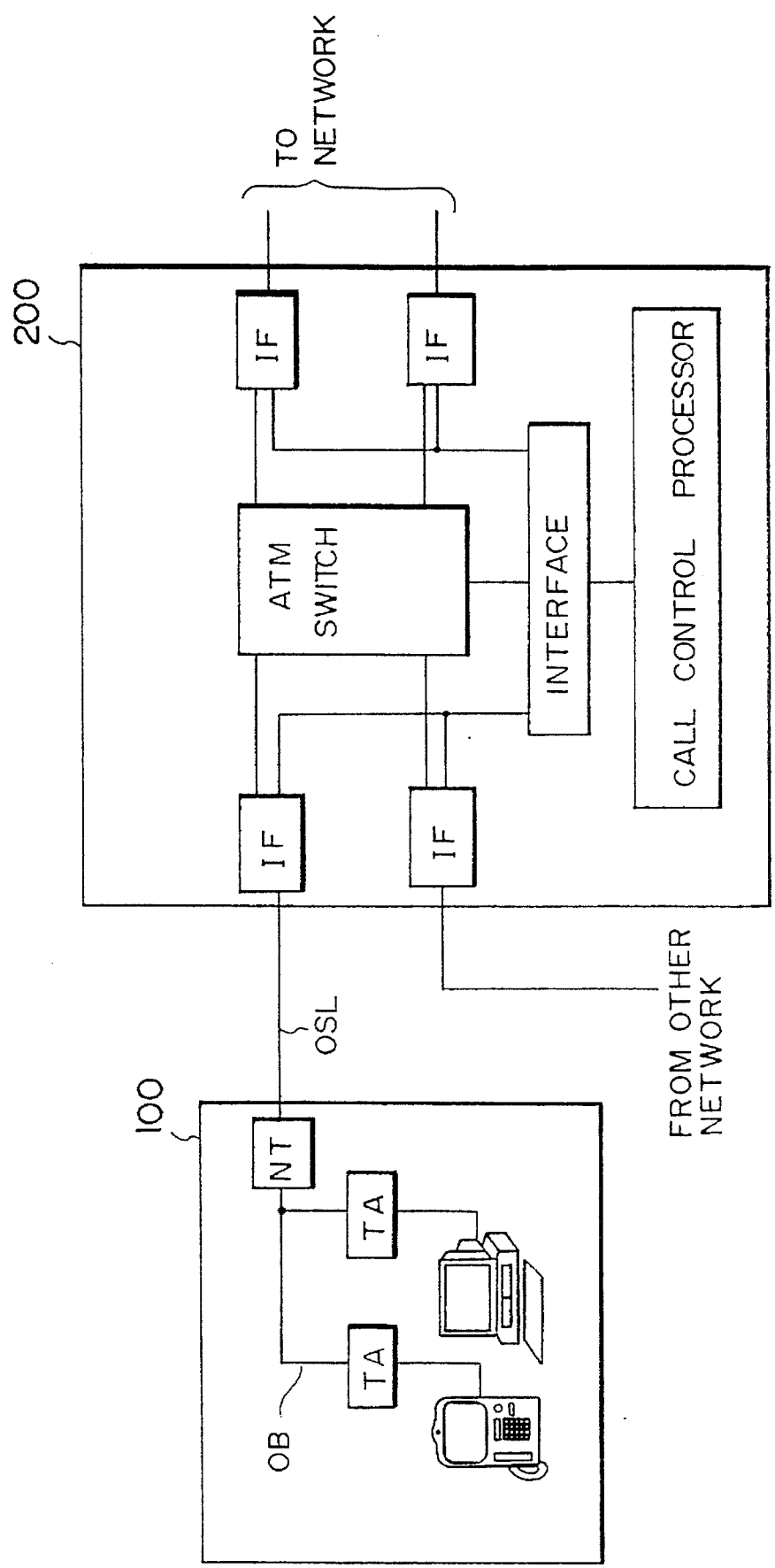
FIG. 2 is a block diagram of an ATM exchange system.

FIG. 2 is a block diagram of an ATM network system to which the present invention is applied. The ATM network system shown in FIG. 2 is composed of a broad band customer station network 100 and an ATM exchange 200. Terminal devices, such as a video phone and a data terminal equipment, are connected to a network terminal equipment NT via optical buses OB. The network 100 and the exchange 200 are mutually connected via an optical subscriber line OSL. The ATM exchange 200 is composed of a plurality of subscriber interface units IF, an ATM switch, an interface unit INTF and a call control processor CP.

Figure 3:
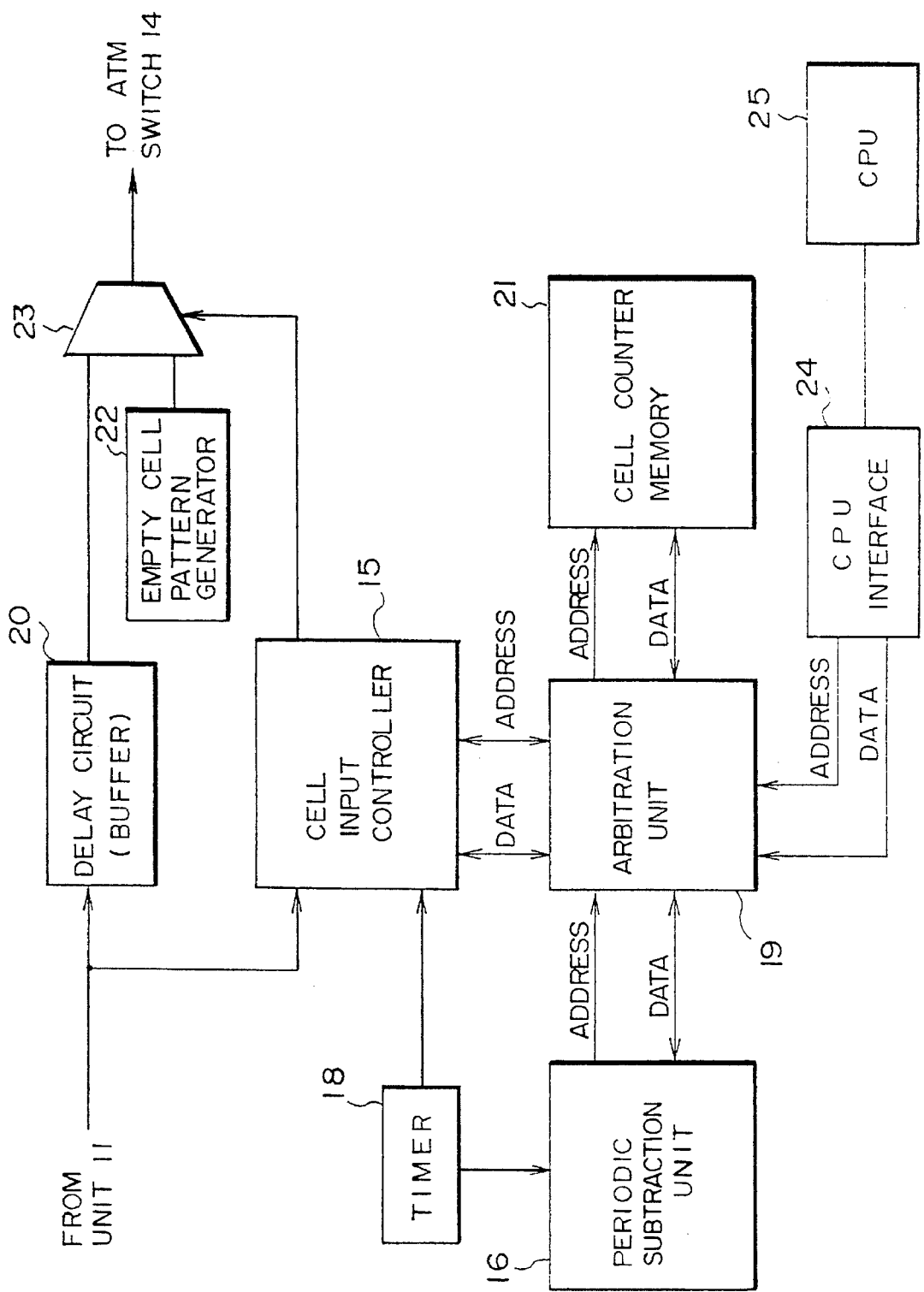
FIG. 3 is a block diagram of a first preferred embodiment of the present invention.

FIG. 3 shows a cell input control unit according to a first preferred embodiment of the present invention. The cell input control unit shown in FIG. 3 is composed of a cell input controller 15, a periodic subtraction unit 16, a timer 18, a memory access concurrence arbitration unit 19, a delay unit (buffer memory or register) 20, a cell counter memory 21, an empty (dummy) cell pattern generator 22, a selector 23, a CPU interface unit 24 and a CPU 25 (which corresponds to the call control processor CP shown in FIG. 2). The cell input control unit is substituted for the cell input controller 12 shown in FIG. 1.

Figure 1:
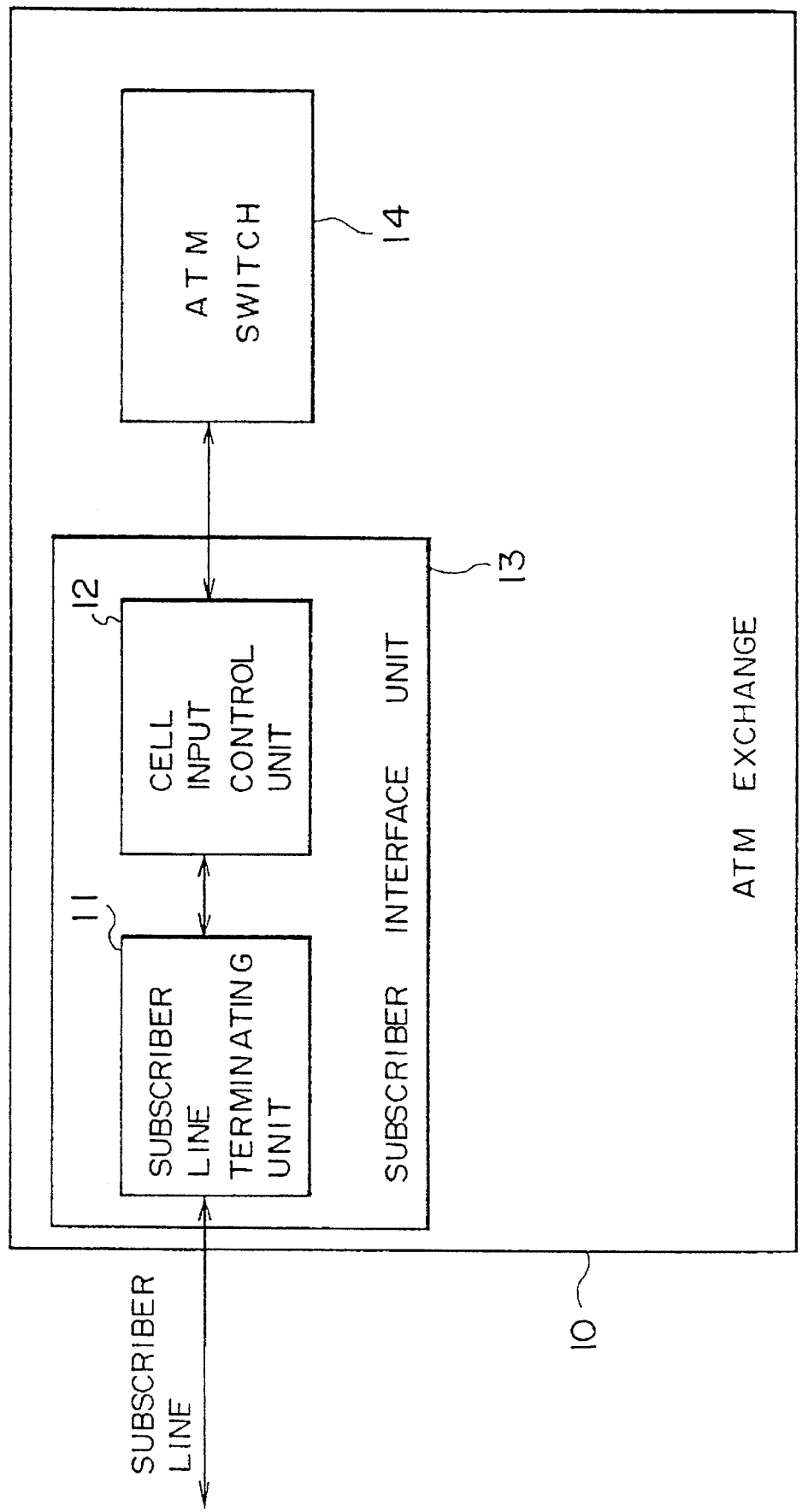
FIG. 1 is a block diagram of a conventional ATM exchange.

An input cell transferred via an input highway from a subscriber line terminating unit as shown in FIG. 1 is temporarily stored in the delay unit 20 formed with, for example, a buffer memory. The cell input controller 15 discriminates the received call by using a virtual channel identifier (VCI) contained in a header area of the input cell. A counter value in the cell counter memory 21 is read out from an area thereof specified by a memory address in which a cell counter value corresponding to the input cell (call) is stored. The readout counter value is input to the arbitration unit 19, which determines whether or not the counter value is equal to or greater than a predetermined threshold value. If the result of this decision is affirmative, the input cell is discarded. If the result of the decision is negative, the input cell is output to the ATM switch, and then the counter value in the cell counter memory 21 is increased by +1 under the control of the arbitration unit 19.

The periodic subtraction unit 16 sequentially supplies all memory addresses to the arbitration unit 19 in response to a clock signal which is generated at predetermined intervals by the timer 18. Then, all memory addresses are input to the cell counter memory 21 via the arbitration unit 19, and the counter values stored in areas respectively indicated by the memory addresses are decreased by "1". Then, the updated counter values are written into the same areas via the arbitration unit 19.

When the cell input controller 15 determines that the cell counter value is smaller than the predetermined threshold value, the cell input controller 15 causes the selector 23 to select the input cell which is temporarily stored in the delay unit 20. The selected input cell is input to the ATM switch 14 (FIG. 1). When it is determined by the cell input controller 15 that the cell counter value is equal to or greater than the predetermined threshold value, the cell input controller 15 makes the selector 23 select the empty cell pattern generator 22. The empty cell passes through the selector 23 and is then input to the ATM switch. Thereby, the input cell in the delay unit 20 is discarded.

Figure 4:
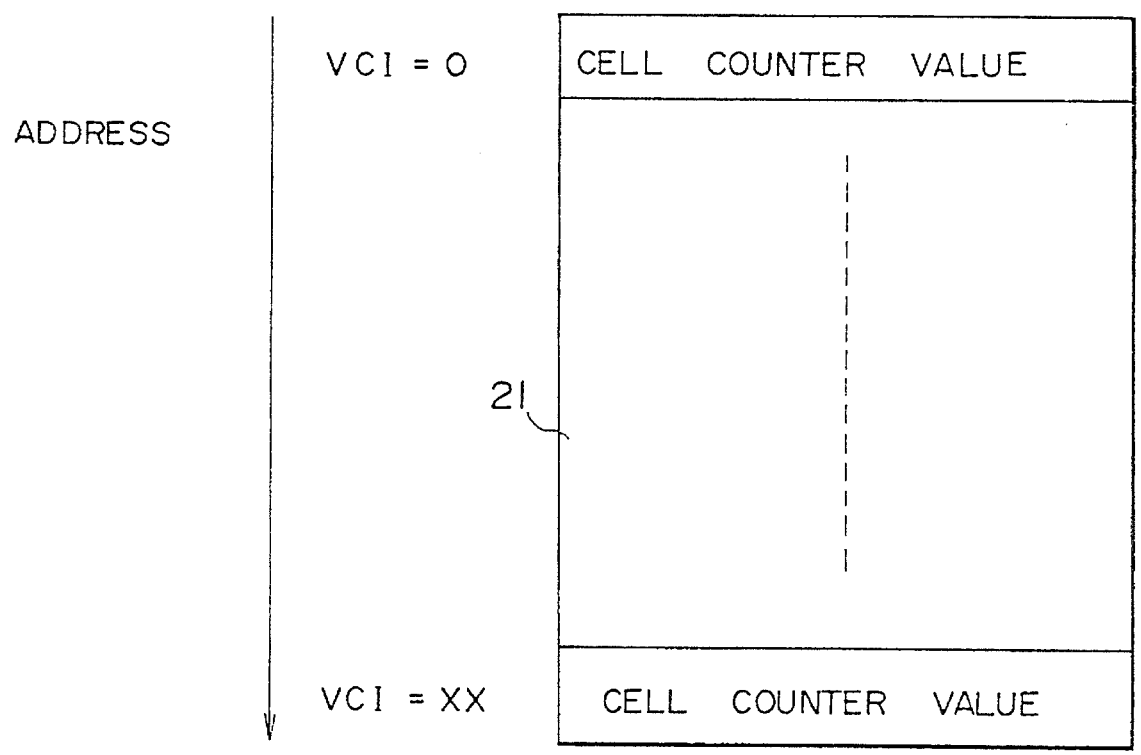
FIG. 4 is a block diagram of the structure of a cell counter memory shown in FIG. 3.

FIG. 4 shows the structure of the cell counter memory 21, which has a storage area for each VCI. In response to an access request from the CPU 25, the memory cell access concurrence arbitration unit 19 accesses the cell counter memory 21 and the periodic subtraction unit 16. The periodic subtraction unit 16 sequentially generates the memory addresses in response to the periodical subtraction request. The arbitration unit 19 outputs the received memory addresses to the cell counter memory 21, and outputs the cell counter values read out from the cell counter memory 21 to the periodic subtraction unit 16. Then, the arbitration unit 19 subtracts "1" from the respective cell counter values, and writes the updated cell counter values into the cell counter memory 21. The above-mentioned procedure is also carried out in response to a call to the cell counter memory 21 from the cell input controller 15.

Figure 5:
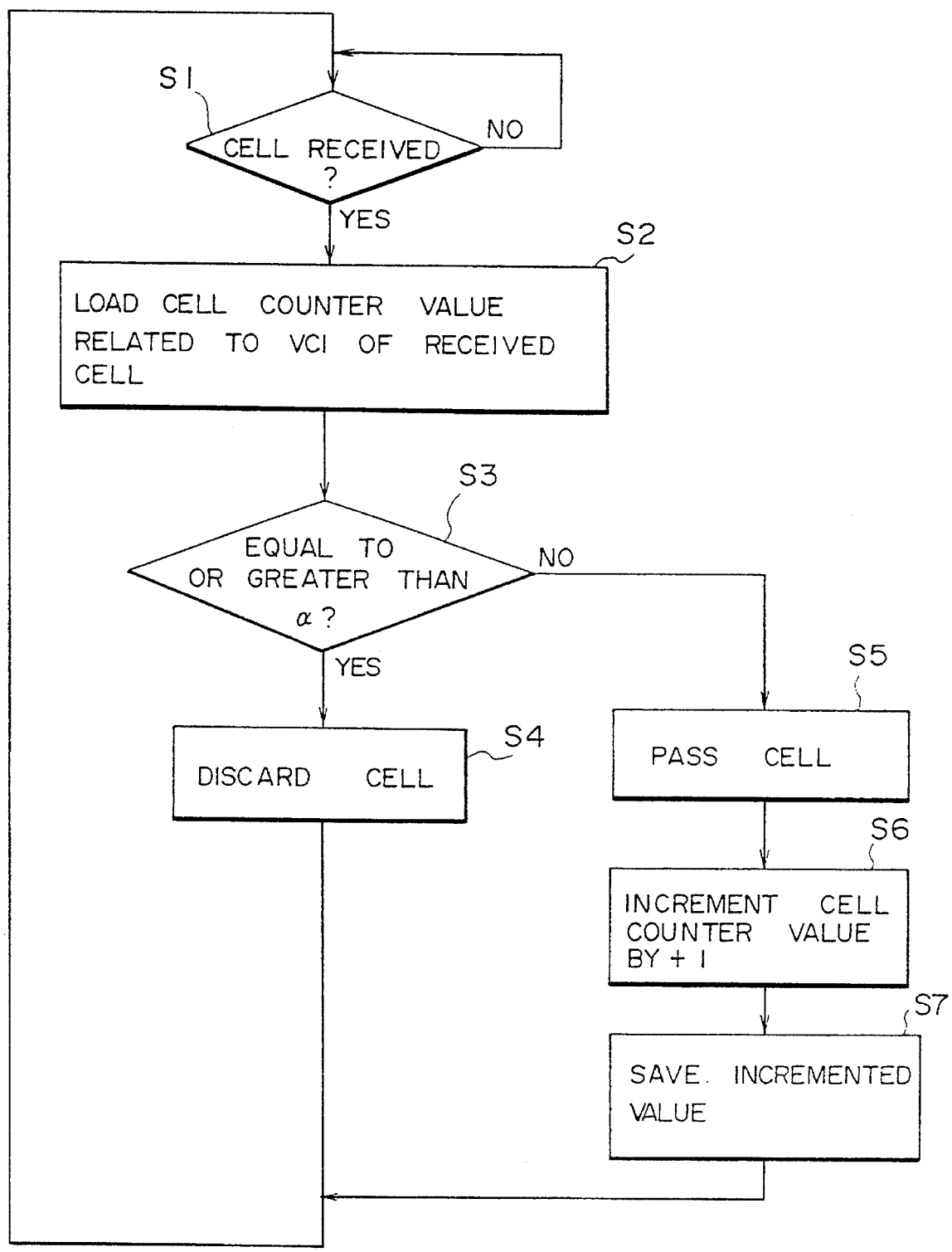
FIG. 5 is a flowchart of the operation of a cell input controller shown in FIG. 3.

FIG. 5 shows the operation of the cell input controller 15. At step S1, the cell input controller 15 determines whether or not an input cell has been received. When the result at step S1 is NO, step S1 is repeatedly executed. When the result at step S1 is YES, at step S2 the cell input controller 15 reads the cell counter value corresponding to the VCI of the received input cell from the cell counter memory 21. At step S3, the cell input controller 15 determines whether or not the received cell counter value is equal to or greater than the predetermined threshold value ($\alpha$). When the result obtained at step S3 is YES, the cell input controller 15 controls the selector 23 so that the input cell is discarded. Then, the procedure returns to step S1. When the result at step S3 is NO, at step S5 the cell input controller 15 instructs the selector 23 to pass the input cell in the delay unit 20. At step S6, the cell input controller 15 increases the cell counter value related to the call (VCI) being processed by "1". At step S7, the cell input controller 15 writes the increased cell counter value in the corresponding area of the cell counter memory 21. Then, the procedure returns to step S1.

Figure 6:
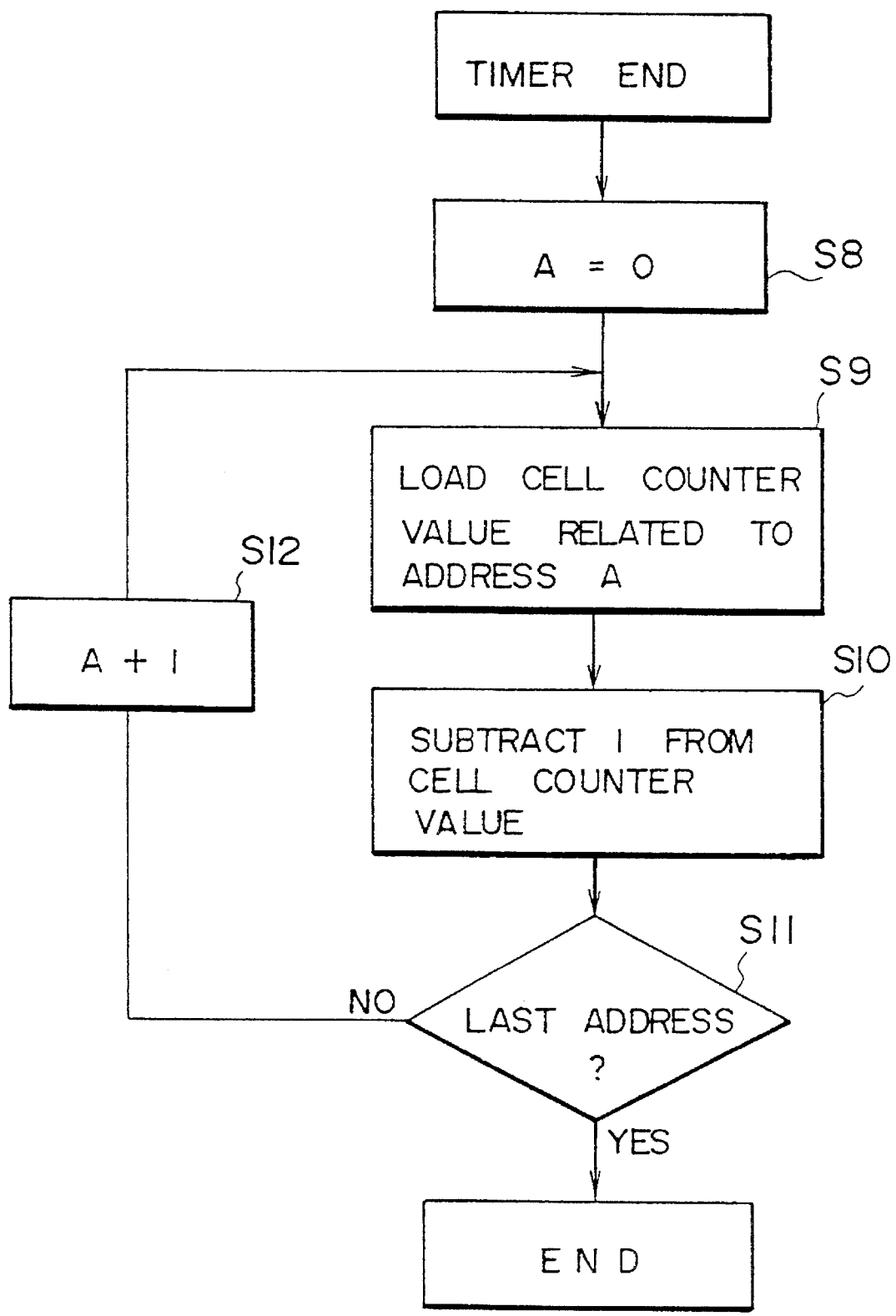
FIG. 6 is a flowchart of the operation of a periodic subtraction unit shown in FIG. 3.

FIG. 6 shows the operation of the periodic subtraction unit 16, which starts to operate in response to the clock signal which is generated by the timer 18 when it measures a predetermined time. At step S8, the periodic subtraction unit 16 sets an address A to 0. At step S9, the periodic subtraction unit 16 reads out the cell counter value specified by the address A from the cell counter memory 21. At step S10, the periodic subtraction unit 16 subtracts "1" from the readout cell counter value, and determines, at step S11, whether or not the address A being considered is the last address of the cell count memory 21. When the result obtained at step S11 is NO, the periodic subtraction unit 16 increases the address A by "1" at step S12. Then, the procedure returns to step S9. When the result at step S11 is YES (VCI equal to "XX" has been accessed), the periodic subtraction unit 16 ends the procedure shown in FIG. 6 activated in response to the pulse signal from the timer 18.

According to the first preferred embodiment of the present invention, it is possible to control cells related to different calls by storing the cell counter values corresponding to the respective VCIs. However, it may be required that the first embodiment of the present invention should be improved for the following reasons.

As has been described previously, all the memory addresses of the cell memory counter 21 are generated and decreased by "1" at predetermined intervals. Thus, if a large number of calls concur, a large number of memory addresses must be generated and thus it takes a long time for the periodic subtraction unit 16 to complete the above subtraction procedure. It is impossible to considerably reduce the time necessary for the procedure on the periodic subtraction unit 16 because the cell counter memory 21 has a predetermined access time. It may be possible to divide the cell counter memory 21 into a plurality of parts which operate in parallel. However, this will increase the size of the structure shown in FIG. 3. Further, the periodic subtraction procedure is executed at predetermined fixed intervals. However, it is desired that the subtraction period varies in accordance with calls because the ATM network handles communications having bit rates between $\times 10^3$ bits and $\times 10^2$ Mbits.

A second preferred embodiment of the present invention is intended to satisfy the above requirements.

Figure 7:
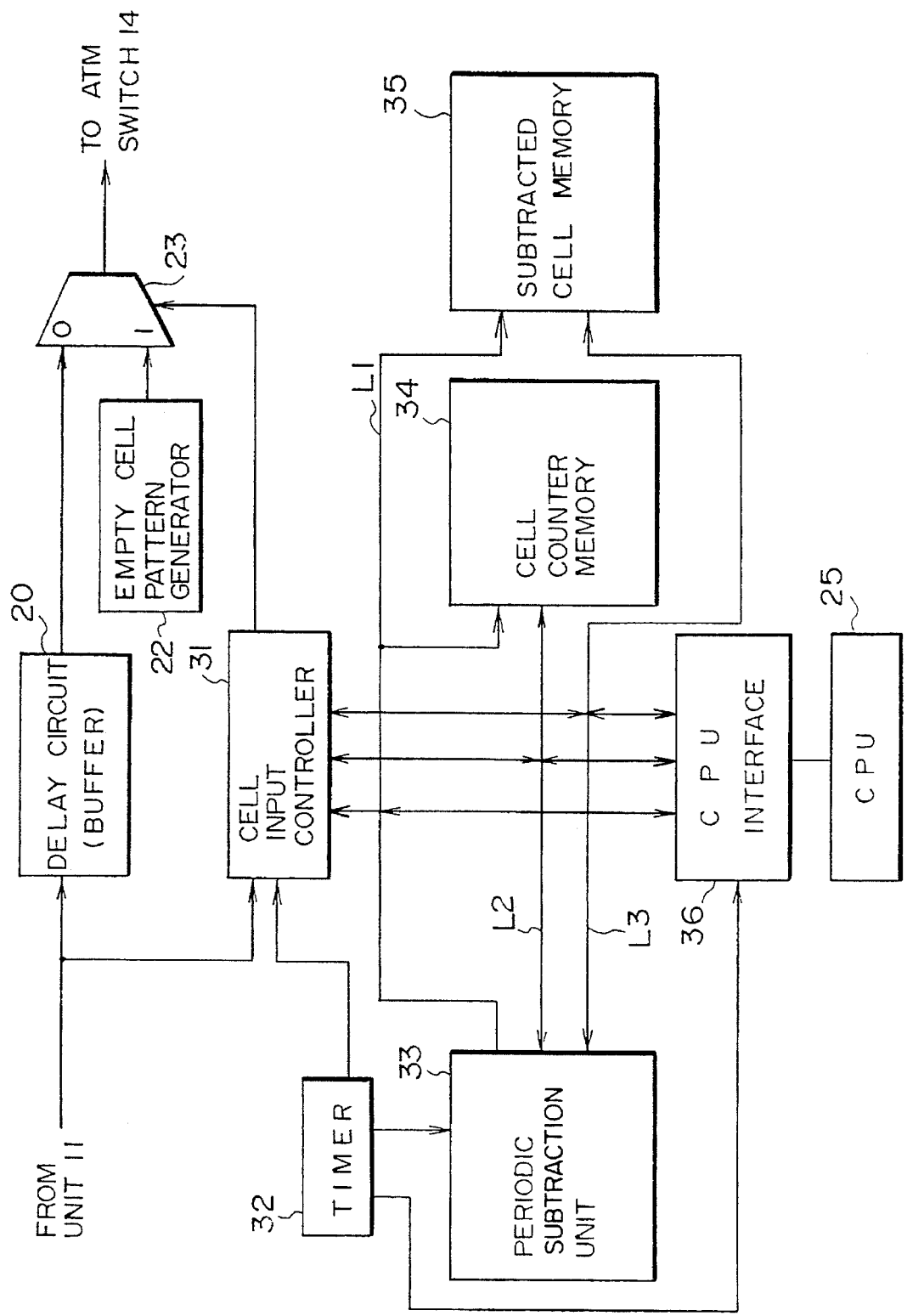
FIG. 7 is a block diagram of a second preferred embodiment of the present invention.

FIG. 7 is a block diagram of the second preferred embodiment of the present invention. In FIG. 6, those parts which are the same as those shown in FIG. 2 are given the same reference numerals. The second embodiment shown in FIG. 7 is composed of a cell input controller 31, a timer 32, a periodic subtraction unit 33, a cell counter memory 34, a subtracted cell number memory 35, and a CPU interface 36 in addition to the aforementioned delay unit 20, the supply cell pattern generator 22, the selector 23 and the CPU 25. The control procedure executed by the CPU 25 shown in FIG. 7 is different from that by the CPU 25 shown in the previously described figures.

The cell input controller 31, the periodic subtraction unit 33, the cell counter memory 34, the subtracted cell number memory 35 and the CPU interface unit 36 are mutually connected via an address line L1. The cell input controller 31, the periodic subtraction unit 33, the CPU interface unit 36 and the cell counter memory 34 are mutually connected via a counter line L2. The cell input controller 31, the periodic subtraction unit 33, the CPU interface unit 36 and the subtracted cell number memory 35 are mutually connected via a cell subtraction line L3. The timer 32 is connected to the cell input controller 31, the periodic subtraction unit 33 and the CPU interface unit 36. The CPU 25 is connected to the CPU interface unit 36.

The periodic subtraction unit 33 decreases the cell counter value stored in the cell counter memory 34 by N (N is an integer) for every time T1 (=N×T) where T denotes the subtraction period (basic period) of the periodic subtraction unit 16 shown in FIG. 3.

The cell input controller 31 subtracts N×(t/T1) from the cell counter value in the cell counter memory 34 each time the input cell is received. The resultant cell counter value (corrected cell counter value) is used for determining whether the input cell should be passed or discarded. The time t1 corresponds to a time passage between the previous subtraction time and the cell arrival time. That is, the following formulas are calculated:

$$FB(t)=G(t)-N\times INT(t/T1) \qquad (2)$$

$$F1B(t)=FB(t)-N\times INT(t1/T1) \qquad (3).$$

where F1B(t) is the cell counter value, β is the tolerable value (the number of cells), G(t) denotes the number of cells obtained during time t, T1 (= N×T) denotes the subtraction period of the periodic subtraction unit 33. When F1B(t)<β, the input cell is supplied to the ATM switch. When F1B(t)>β, the input cell is discarded.

The number N which is to be subtracted from the cell counter value can be a fixed number, or a variable number which varies for each terminal or each call. When the variable number is used, the subtracted cell numbers for the respective VCIs are stored in the subtracted cell number memory 35. The memory address which is generated by the periodic subtraction unit 33 and which corresponds to the VCI contained in the header portion of the input cell is applied to not only the cell counter memory 34 but also the subtracted cell number memory 35. Thereby, the cell counter value corresponding to the input cell is read out from the cell counter memory 34, and the subtracted cell number (the number of cells to be subtracted) corresponding to the input cell is read out from the subtracted cell number memory 35. Then, the periodic subtraction unit 33 subtracts, for every period T1, the variable number from the cell counter value, which is written into the cell counter memory 34. The relationship between the number of cells N1 which is stored in the subtracted cell number memory 35 and the subtraction period T2 is defined as follows:

$$N1=INT\ (T2/T) \qquad (4)$$

If it is required that the subtraction period is set to be half the basic subtraction period, 2×N is stored in the subtracted cell number memory 35, and 2N is subtracted for every period T1 (=T1 =N×T). This operation corresponds to an operation in which one cell is subtracted for every T/2.

Figure 9:
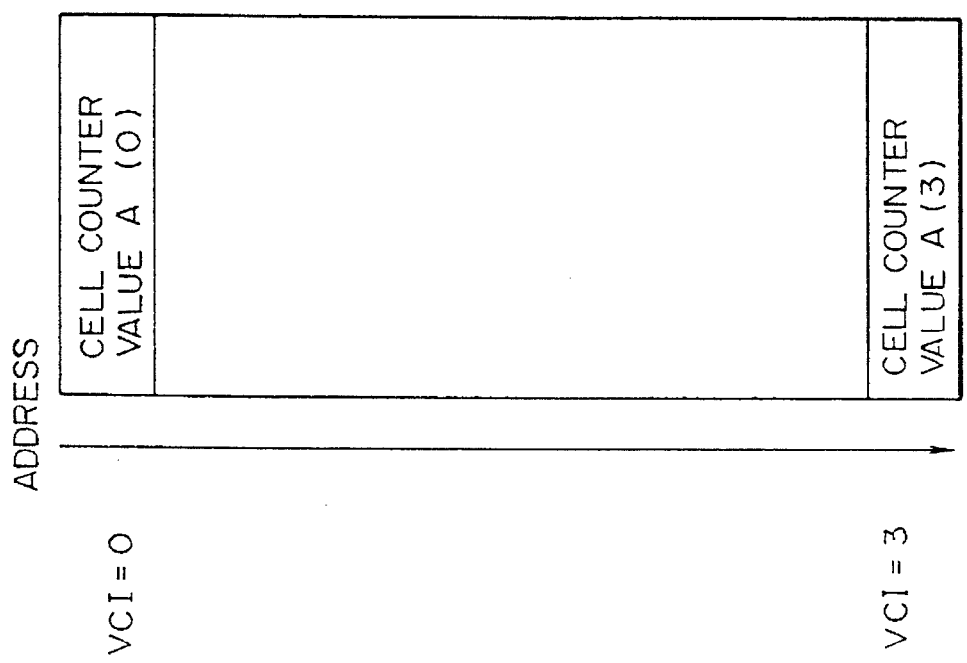
FIG. 9 is a block diagram of the structure of a subtracted cell number memory shown in FIG. 7.
Figure 8:
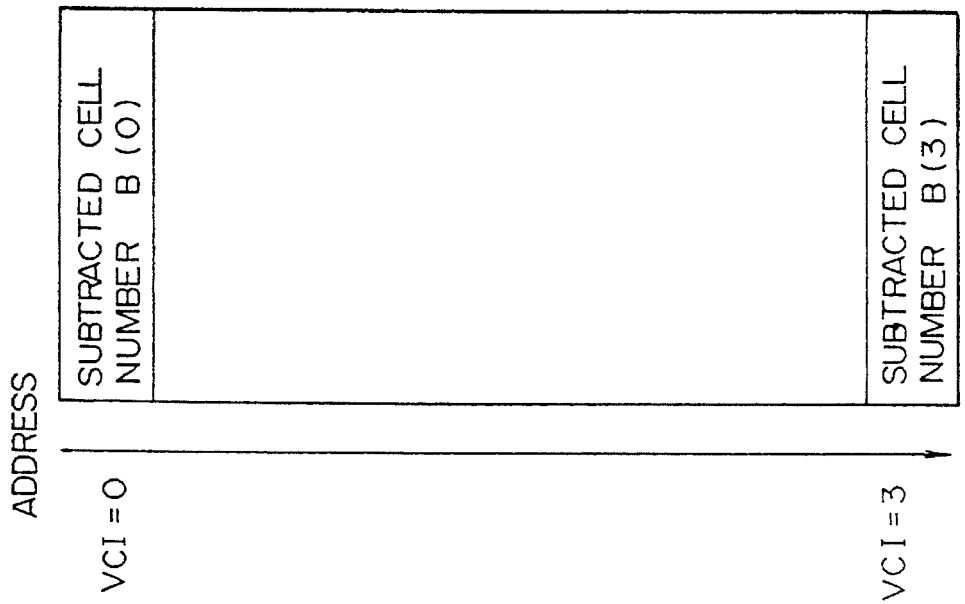
FIG. 8 is a block diagram of the structure of a cell counter memory shown in FIG. 7.

FIG. 8 shows the structure of the cell counter memory 34, and FIG. 9 shows the structure of the subtracted cell number memory 35. The cell counter memory 34 has storage areas corresponding to the respective VCIs, and the subtracted cell number memory 35 has storage areas corresponding to the respective VCIs. The memory address supplied in common to the memories 34 and 35 indicates the storage areas of the memories 34 and 34 corresponding to the same VCI. A cell counter value A(0) is stored in the storage area of the cell counter memory 34 corresponding to the VCI "0", and a subtracted cell number B(0) is stored in the storage area of the subtracted cell number memory 35 corresponding to the VCI "0". Identical subtracted cell numbers B( ) or different subtracted cell numbers B( ) can be defined for the respective VCIs.

Although each of the memories 34 and 35 has four storage areas corresponding to four VCIs for the sake of simplicity, the present invention is not limited to four storage areas. Since each time the call is received, the CPU 35 stores the corresponding subtracted cell number in the memory 35 via the input cell controller 31 and the CPU interface 36.

Figure 10:
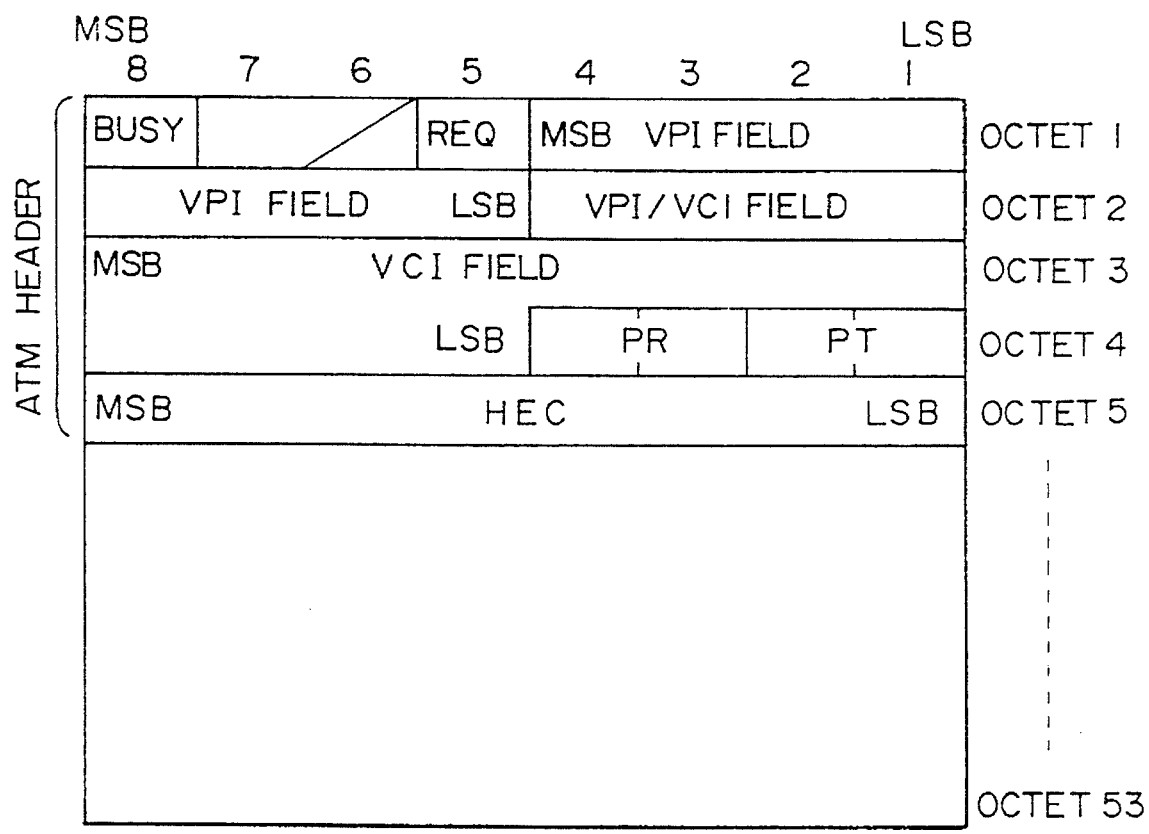
FIG. 10 is a block diagram of a heater of a cell.

FIG. 10 shows the header of the cell processed by the ATM exchange. One cell is composed of 53 octets, each consisting of eight bits. Octet "1" has a busy field, a request field (REQ) and a VPI field. Octet "2" has a VPI (Virtual Pass Identifier) field and a VPI/VCI field. Octet "3" has a VCI field. Octet "4" has a VCI field, a PR field and a PT field. Octet "5" has an HEC field. The header of the cell is composed of octets "1" through "5".

Figure 11:
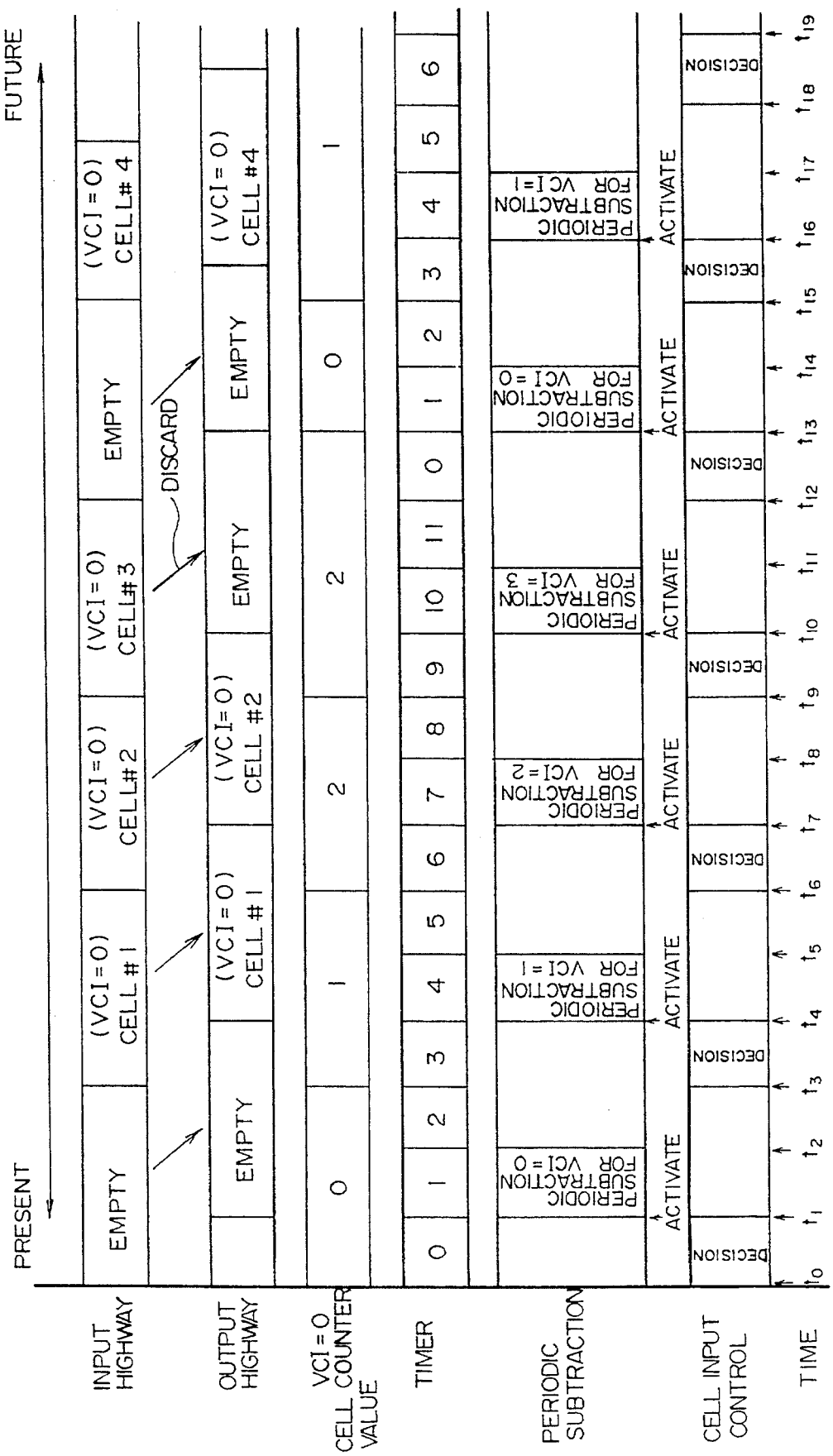
FIG. 11 is a timing chart of the operation of the second preferred embodiment of the present invention shown in FIG. 7.

In order to describe the second embodiment of the present invention in more detail, the following conditions will now be assumed. First, there are four VCIs ("0"–"3") for the sake of simplicity. Second, the basic cell subtraction period corresponds to a time necessary for two cells to pass through the structure shown in FIG. 7. Third, the subtraction period of the cell counter memory 34 corresponds to a time necessary for four cells to pass through the structure shown in FIG. 7. Fourth, the tolerable (threshold) value $\beta$ is 2. Fifth, the initial cell counter value for VCI="0" is 0. Sixth, cells are transmitted via the input and output highways at predetermined identical intervals (cell period), as shown in FIG. 11. Seventh, the timer 32 operates in synchronism with the input cell, and is a 12-nary counter which executes the count operation in synchronism with a clock signal having a period equal to ⅓ the cell period.

FIG. 11 is a timing chart showing the operation of the apparatus shown in FIG. 7 which operates under the above-mentioned conditions. At time t3, an input cell (VCI=0) is received via the input highway. At this time, the cell input controller 31 reads out the cell counter value for VCI=0 from the cell counter memory 34 and reads out the subtracted cell number from VCI=0 from the subtracted cell number memory 35. In the example being considered, the cell count number is 0, and the subtracted cell number is 2.

Figure 12:
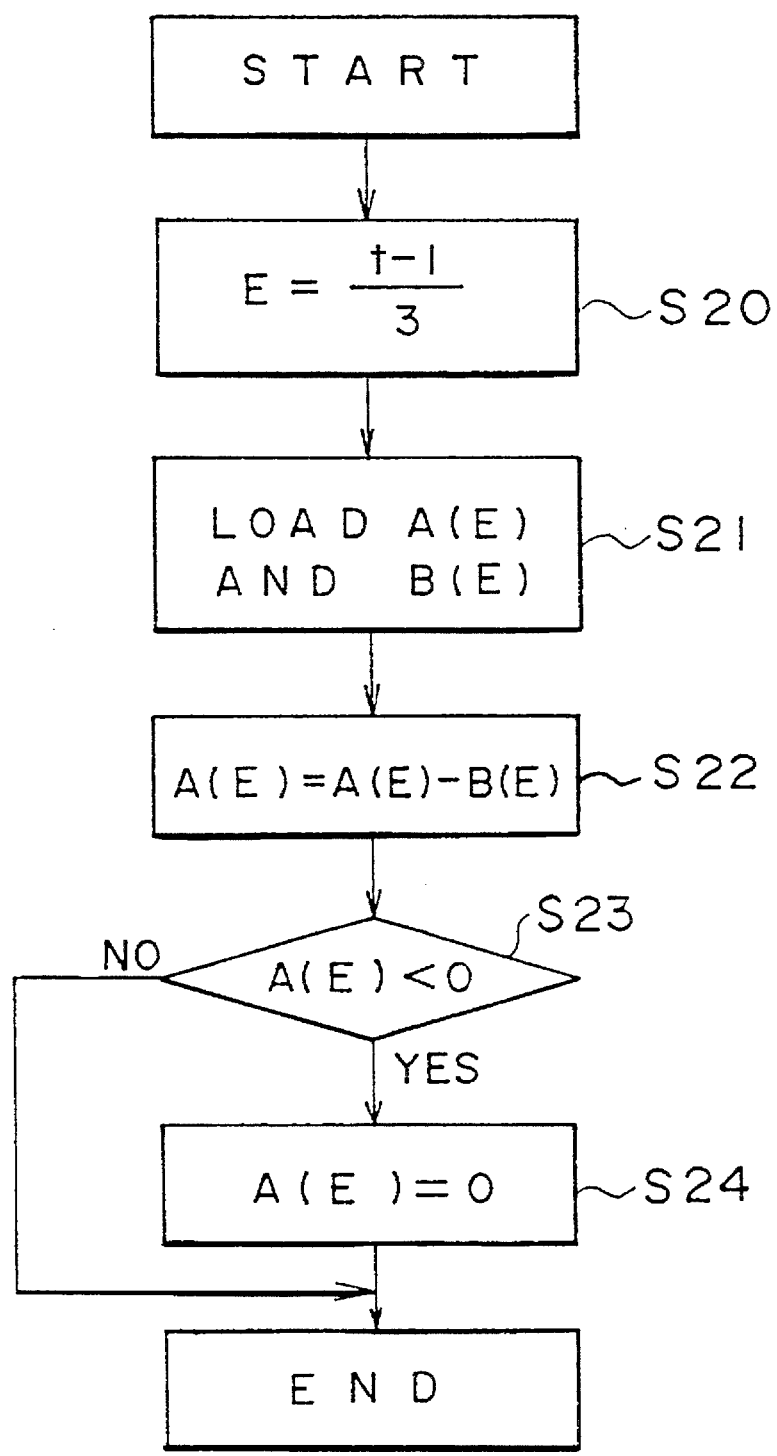
FIG. 12 is a flowchart of the operation of a periodic subtraction unit shown in FIG. 7.

FIG. 12 shows the operation of the periodic subtraction unit 33. According to the aforementioned conditions, the timer 32 activates the periodic subtraction unit 33 when it shows "3N+1". At step S20, the periodic subtraction unit 33 calculates E=(t−1)/3 where E is the address indicating the area of the cell counter memory 34 in which the cell counter value A(E) is stored. At step S21, the address E is supplied to the cell counter memory 34 and the subtracted cell number memory 35, and the cell counter value A(E) and the subtracted cell number B(E) are read out from the memories 34 and 35, respectively. At step S22, the periodic subtraction unit 33 subtracts the subtracted cell number B(E) from the cell counter value A(E). The result of this subtraction replaces by the cell counter value A(E) read out at step S21, and is written into the same storage area of the cell counter memory 34. At step S23, the cell subtraction unit 33 determines whether or not the updated cell counter value A(E) is smaller than zero, that is, whether or not the updated cell counter value A(E) has a negative value. When it is determined, at step S23, that the cell counter value A(E) is a positive value, the procedure ends. When it is determined that the cell counter value A(E) is a negative value, the cell counter value is set to zero at step S24 in order to prevent it from having the minus sign.

The cell input controller 31 calculates the correction value from the subtracted cell number and the timer value indicated by the timer 32. In the example being considered, the correction value is equal to 0. Thus, the cell input controller 32 determines that the input cell in the delay unit 20 should be output to the ATM switch. At this time, the cell input controller 31 increments the cell counter value by 1, and writes the incremented cell counter value into the cell count memory 34. Further, the cell input controller 31 instructs the selector 23 to select the delay unit 20.

Figure 13:
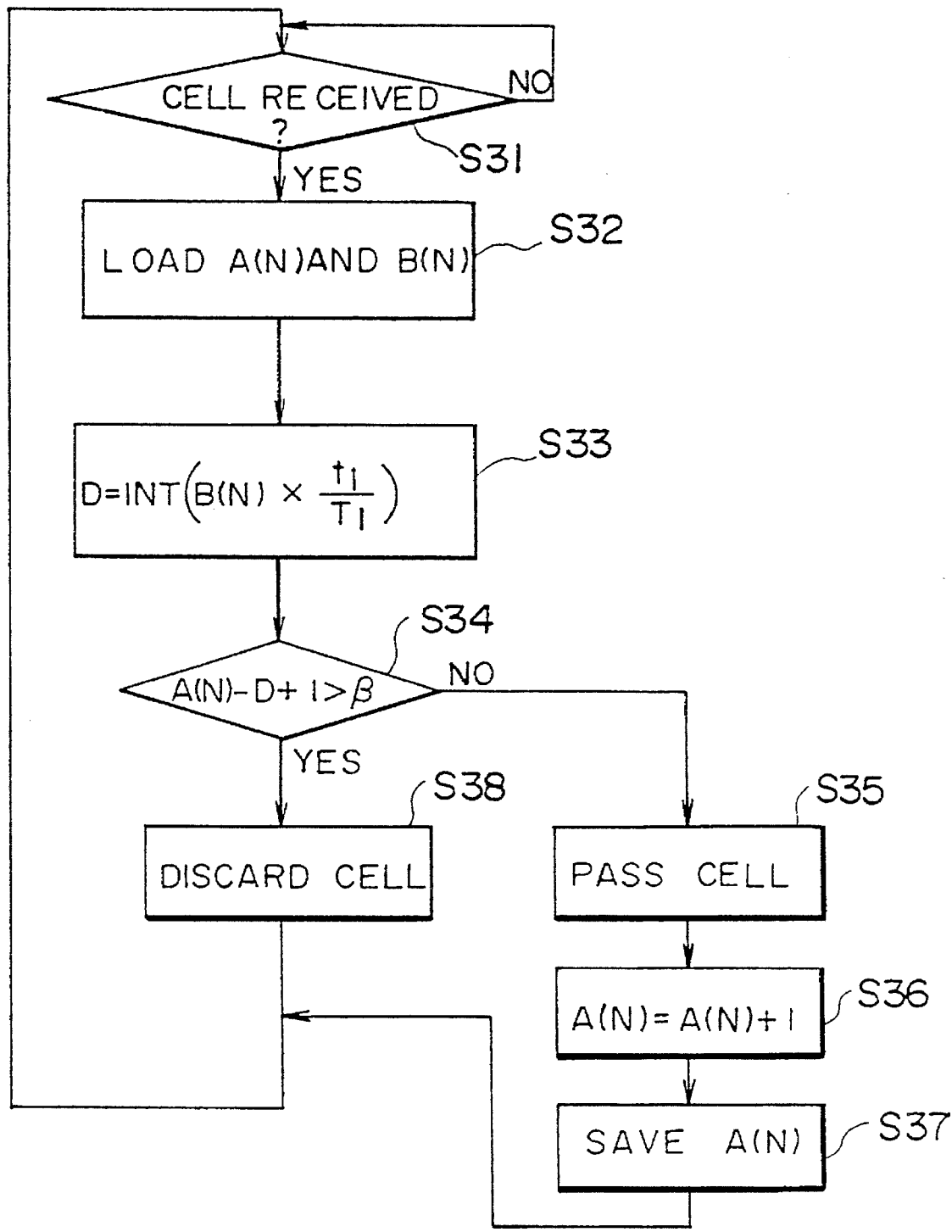
FIG. 13 is a flowchart of the operation of a cell input controller shown in FIG. 7.

FIG. 13 shows the operation of the cell input controller 31. At step 31, the cell input controller 31 determines whether or not an input cell is received. Step 31 is repeatedly carried out until an input cell has been received. When the result at step S31 is YES, at step S32 the cell input controller 31 reads out the cell counter value A(N) for VCI=N (N is the VCI of the input cell) from the cell counter memory 34, and reads out the subtracted cell number B(N) for VCI=N from the subtracted cell number memory 35. At step S33, the cell input controller 31 obtains the correction value, labeled D, by calculating INT[B(N)×(t1/T1)].

At step S34, the cell input controller 31 determines whether or not (A(N)−D+1) >$\beta$. When the result at step S34 is YES, the cell input controller 31 instructs the selector 23 to select the empty cell pattern generator 22, so that the input cell in the delay unit 20 is discarded. When the result at step S34 is NO, the cell input controller 31 instructs the selector 23 to select the delay unit 20. At step S36, the cell input controller 31 increases the cell counter value A(N) by 1, and writes the increased cell counter value into the corresponding storage area of the cell counter memory 34. Then, the procedure returns to step S31. In the above-mentioned manner, it is determined whether the input cell should be discarded or passed each time the input cell is received.

Referring to FIG. 11, a cell (VCI=0) is input via the input highway at time t6. At this time, the cell counter value is 1, the subtracted cell number is 1, the correction value is 1 and the corrected subtracted cell number is 1. Thus, the cell input controller 31 determines that the input cell can be output to the ATM switch, and instructs the selector 23 to select the delay unit 20. Then, the cell input controller 31 increases the cell counter value by 1 and writes the increased cell counter value into the cell counter memory 34.

At time t9, an input cell (VCI=0) is input via the input highway. At this time, the cell counter value is 2, the subtracted cell number is 1, the correction value is 1, and the corrected subtracted cell number is 2. Thus, the cell input controller 31 determines that the number of input cells for VCI=0 has become greater than the tolerable number of cells. As a result, the cell input controller 31 instructs the selector 23 to select the empty cell pattern generator 22, so that the empty cell pattern is output to the ATM switch.

The periodic subtraction unit 33 is periodically activated, more specifically, one time per one cell. According to the procedure shown in FIG. 13, the periodic subtraction unit 33 decreases the cell counter value corresponding to the VCI. For example, the cell counter value corresponding to the VCI "0" is decreased at times t1 and t9.

At time t9, the periodic subtraction unit 33 is activated by the timer 32, and operates as follows. The periodic subtraction unit 33 recognizes, from the timer value indicated by the timer 32, that the procedure on VCI=0 should be executed. The periodic subtraction unit 33 reads out the cell counter value corresponding to VCI "0" from the cell counter memory 34 and reads out the subtracted cell number corresponding to VCI "0" from the subtracted cell number memory 35. Then, the periodic subtraction unit 33 subtracts the subtracted cell number from the cell counter value. At time t9, the subtracted cell number is subtracted from the cell counter value. In this case, 2−2=0.

A description will now be given of a third preferred embodiment of the present invention with reference to FIG. 14. The apparatus shown in FIG. 14 is composed of a cell input controller 43, a periodic subtraction counter 44, a cell counter memory 45, an input cell number gathering unit 46 and a timer 47 in addition to the aforementioned delay unit 20, the empty cell pattern generator 22, and the selector 23.

The input cell is input to the delay unit 20 and the cell input controller 43. The periodic subtraction counter 44 increases its counter value by, for example, 1 in response to the timer value indicated by the timer 47. The cell input controller 43 discriminates the VCI contained in the input cell, and reads out the cell counter value corresponding to the discriminated VCI from the cell counter memory 45. Then, the cell input controller 43 subtracts the counter value in the periodic subtraction counter 44 from the readout cell counter value. Then, the cell input controller 43 determines whether or not the result of this subtraction is equal to or greater than a tolerable value γ. When the result of this determination is affirmative, the cell input controller 43 controls the selector 23 to select the empty cell pattern generator 22, so that the input cell is discarded. When the result of the above determination is negative, the cell input controller 43 instructs the selector 23 to select the delay unit 20. In this case, the cell input controller 43 increases the cell counter value corresponding to the discriminated VCI by 1, and writes the increased cell counter value in the cell counter memory 45.

Figure 14:
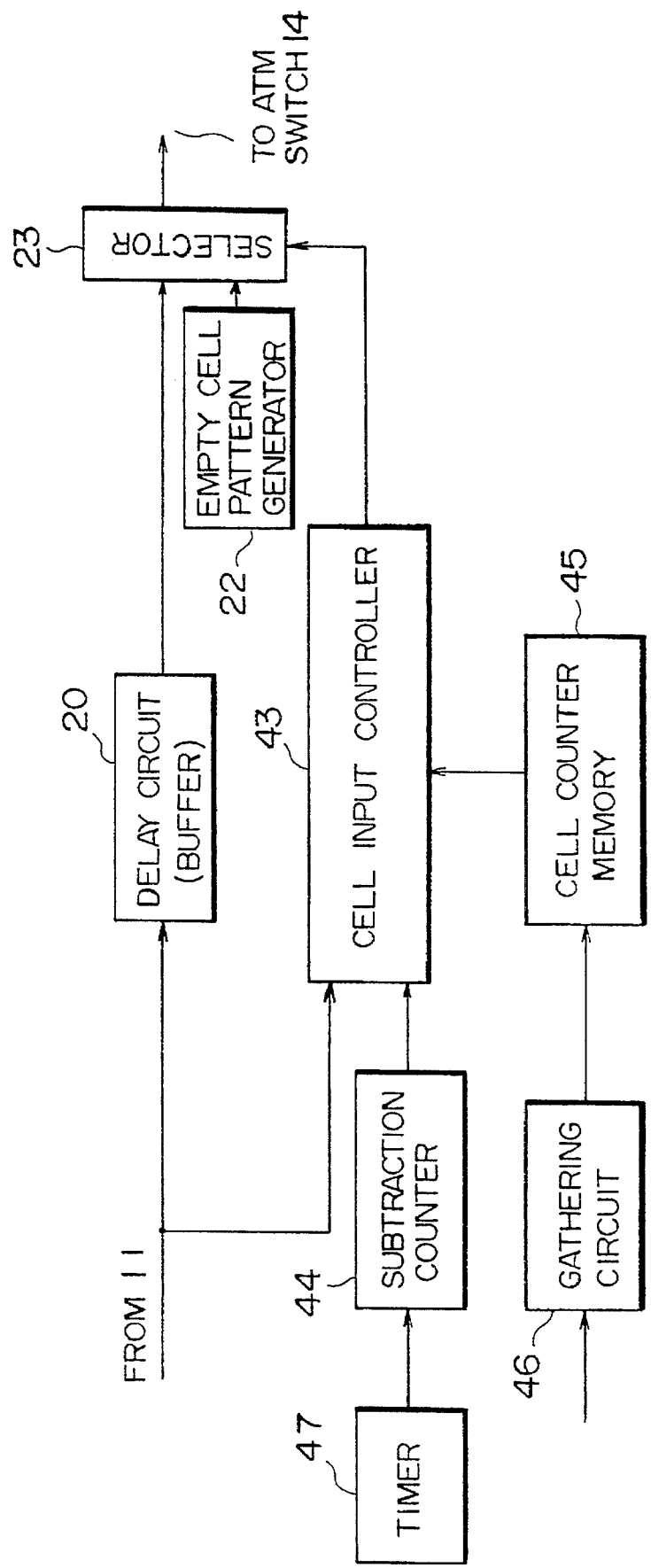
FIG. 14 is a block diagram of a third preferred embodiment of the present invention.
Figure 15:
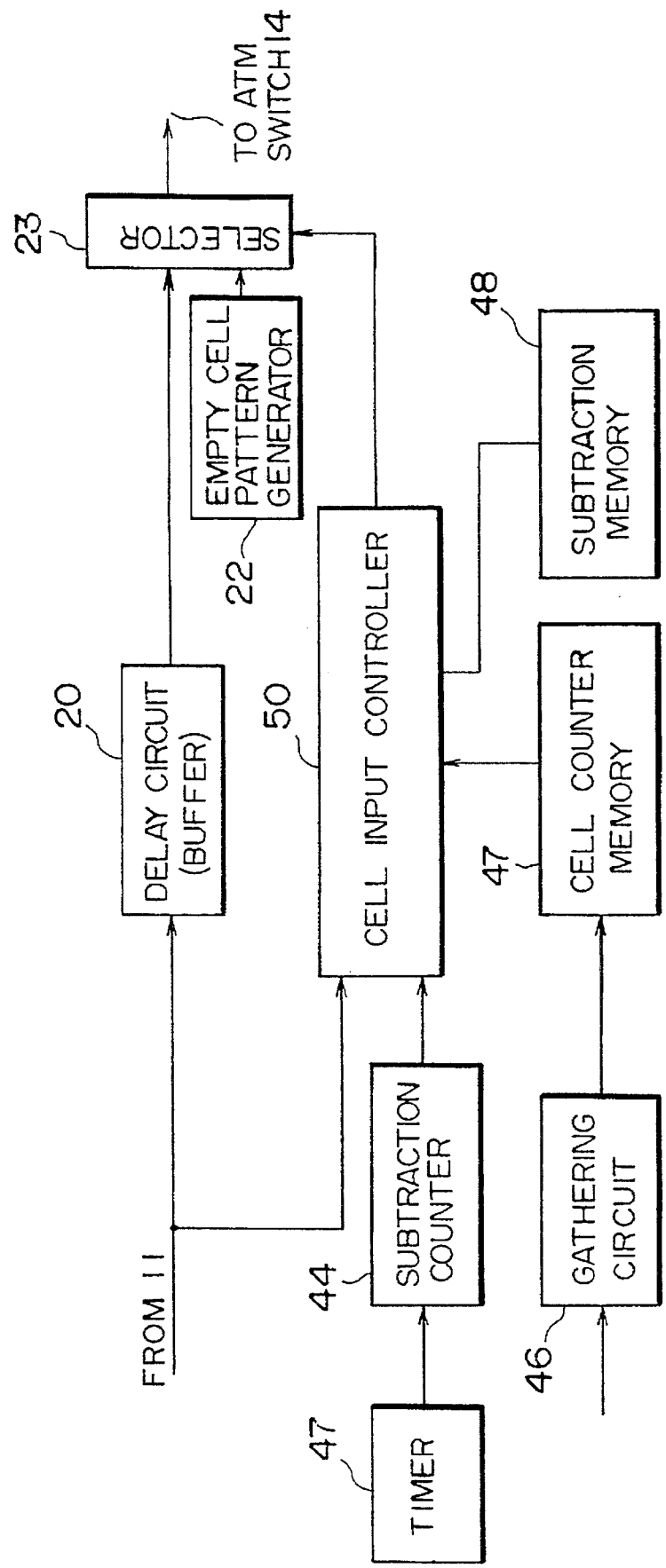
FIG. 15 is a block diagram of a variation of the structure shown in FIG. 14.

FIG. 15 shows a variation of the configuration shown in FIG. 14. A subtraction memory 48 is added to the configuration shown in FIG. 14, and a cell input controller 50 is substituted for the cell input controller 43 in FIG. 14. The subtraction memory 48 stores subtraction multiplying factors C(N) corresponding to the respective VCIs. The following relationship between the subtraction multiplying factor C(N) and the count-up period (basic period) T of the periodic subtraction counter 44 is defined:

$$C(N)=Ti(N)/T \quad (5)$$

where Ti(N) is a desired subtraction period for VCI=N, and determined on the value (average band, maximum band or the like) declared when the subscriber multiplying factors a call.

The periodic subtraction unit 44 periodically increases its counter value by 1 in response to the timer value indicated by the timer 47. Upon receiving the input cell, the cell input controller 50 discriminates the VCI of the input cell. Then, the cell input controller 50 calculates the number of cells which is to be subtracted by multiplying the subtraction multiplying factor C(N) by the current counter value D(t) in the periodical subtraction counter 44. After that, the input cell controller 50 calculates the the following:

$$A(N)-D(t) \times C(N)$$

The input cell controller 50 compares the resultant value with the tolerable value γ in order to determine whether the input cell should be passed or discarded.

The cell input number gathering unit 46 used in each of the configurations shown in FIGS. 14 and 15 reads the contents of the cell counter memory 45 in response to an instruction signal from a charging information management unit (not shown in FIG. 15) under the control of the processor CP (FIG. 2). The readout contents of the cell counter memory 45 can be used for the charging procedure or the traffic management.

Figure 16:
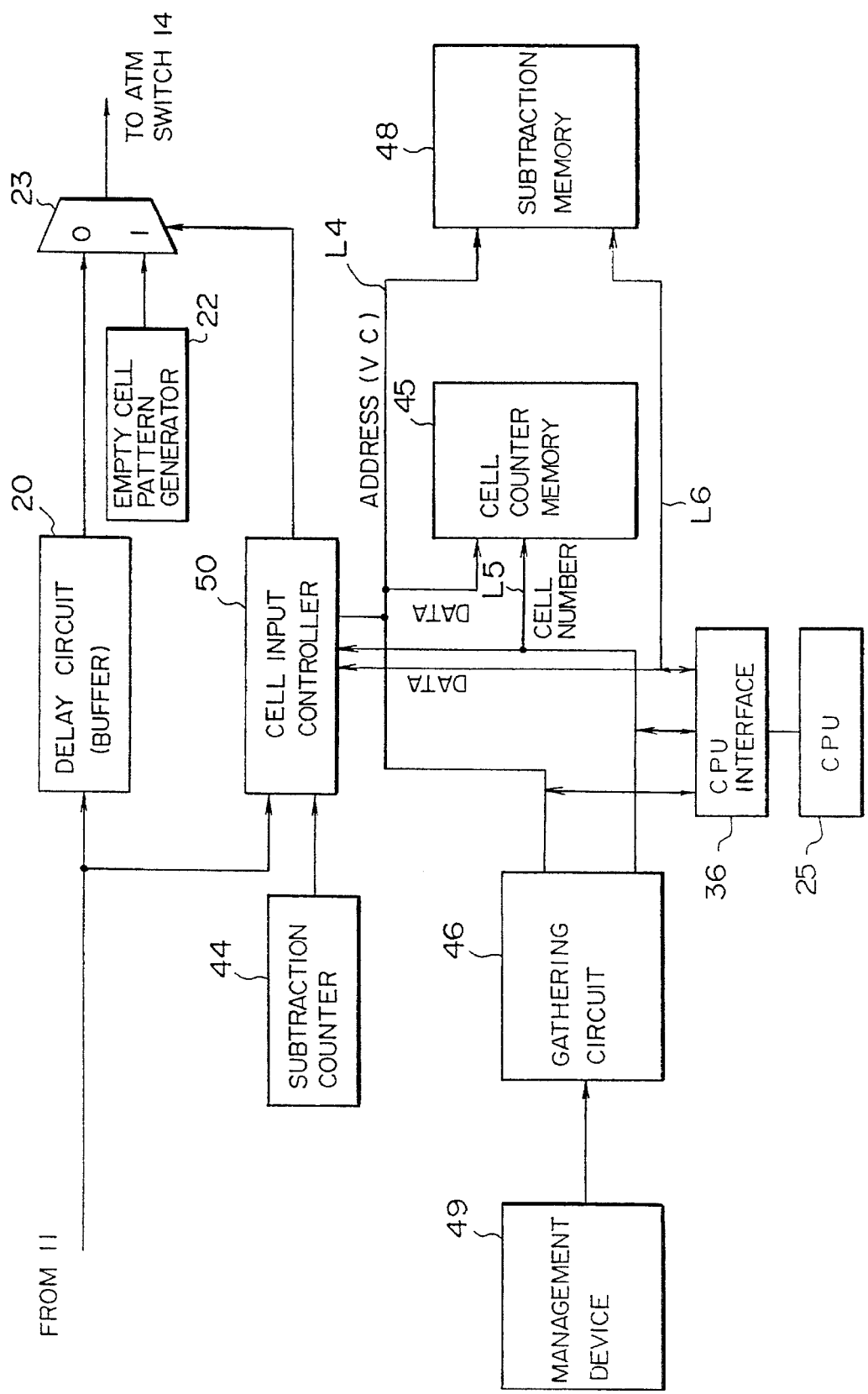
FIG. 16 is a block diagram showing the structure in more detail.

FIG. 16 shows the structure shown in FIG. 15 in more detail. In FIG. 16, those parts which are the same as those shown in FIG. 15 are given the same reference numerals. A charge information management device 49 is connected to the input cell number gathering unit 46. The cell input controller 50 is connected, via a line L4, the cell counter memory 45, the cell input number gathering unit 46 and the subtraction memory 48. The memory address corresponding to the VCI of the input cell is transferred via the line L4. The cell input controller 50 is connected to the cell counter memory 45 and the cell input number gathering unit 46 via a line L5. The cell counter value is transferred via the line L5. The cell input controller 50 is connected to the subtraction memory 48 via a line L6 through which the subtraction multiplying factor is transferred.

Figure 17:
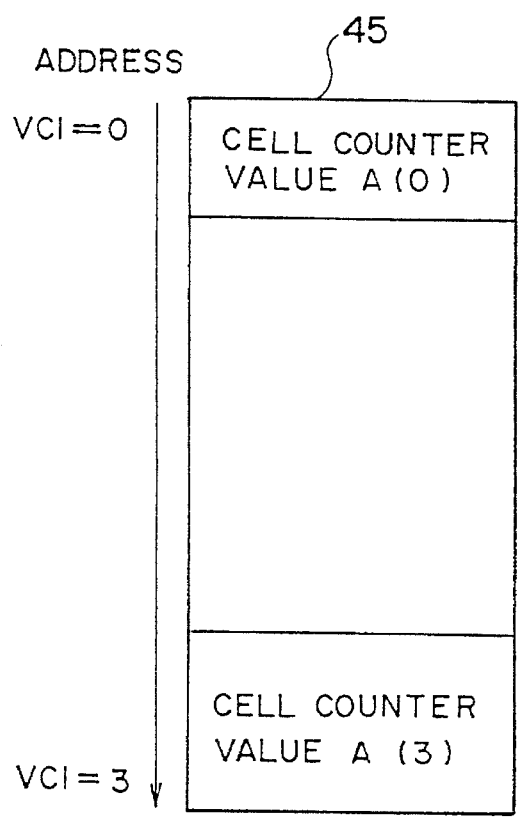
FIG. 17 is a block diagram of the structure of a cell counter memory shown in FIG. 16.
Figure 18:
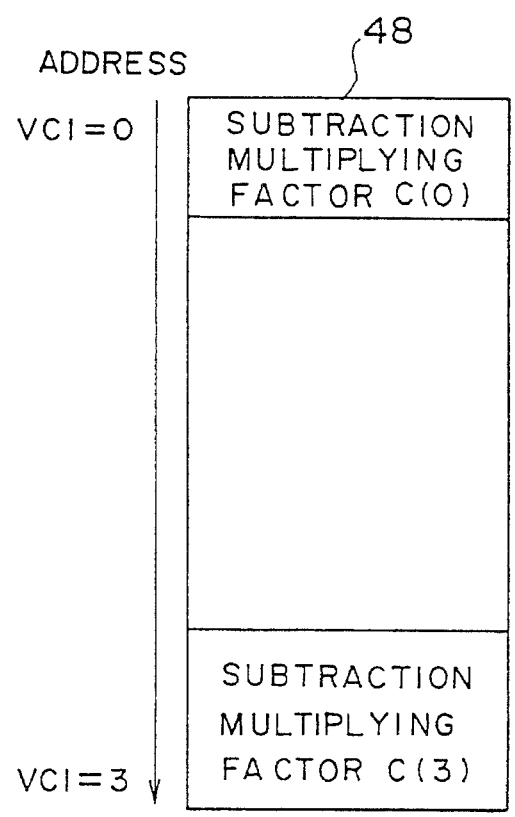
FIG. 18 is a block diagram of the structure of a subtraction memory shown in FIG. 16.

FIG. 17 shows the structure of the cell counter memory 45, and FIG. 18 shows the structure of the subtraction memory 48. The cell counter memory 45 has four storage areas respectively related to VCI "0"–"3". The cell counter numbers A(0)–A(3) respectively related to the VCI "0"–VCI "3" are stored in the respective storage areas. The subtraction memory 48 has four storage areas respectively related to VCI "0"–VCI "3". The subtraction multiplying factors C(0)–C(3) respectively related to the VCI "0"–VCI "3" are stored in the respective storage areas. As has been described previously, the subtraction multiplying factors C(0)–C(3) are determined on the basis of the average band and/or maximum band declared by the respective subscribers when generating calls.

Figure 19:
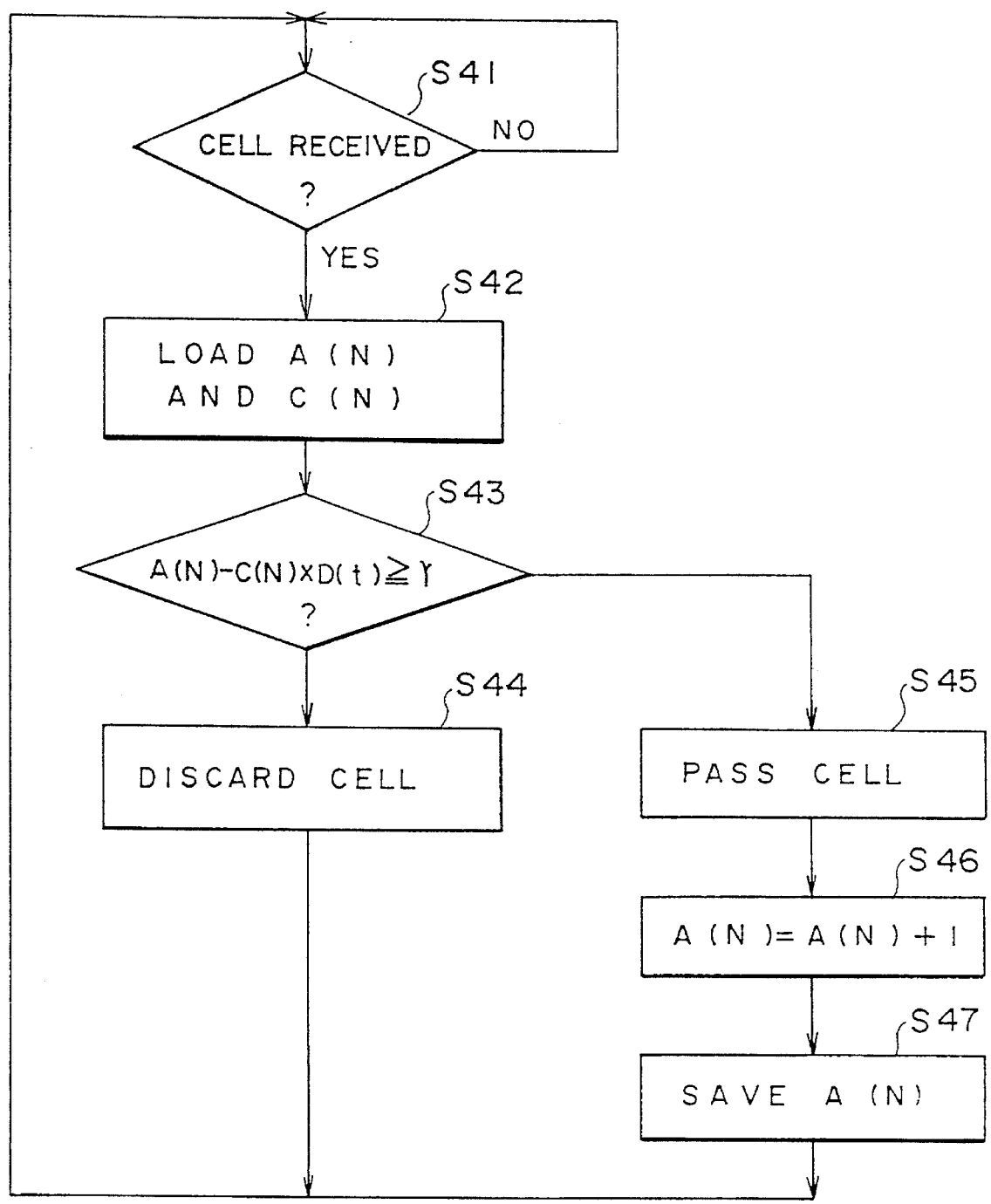
FIG. 19 is a flowchart of the operation of an input cell controller shown in FIG. 16.

A description will now be given of the operation of the apparatus shown in FIG. 16 with reference to FIG. 19, which shows the procedure executed by the cell input controller 50. At step S41, the cell input controller 50 determines whether or not an input cell is received. When an input cell is received, the cell input controller 50 recognizes the VCI of the received cell. At step 42, the cell input controller 50 reads out the cell counter value A(N) corresponding to the VCI (=N in this example) from the cell counter memory 45 and reads out the subtraction multiplying factor C(N) corresponding to the VCI "N". Further, the input cell controller 50 reads the current counter value in the subtraction counter 44. At step S43, the input cell controller 50 determines whether or not A(N)–C(N)×D(t)≧γ. When the result obtained at step S43 is YES, the input cell controller 50 controls the selector 23 so that it selects the empty cell pattern generator 22. Hence, the input cell in the delay unit 20 is discarded. Then, the procedure returns to step S41. When the result obtained at step S43 is NO, the cell input controller 50 instructs the selector 23 to select the delay unit 20, so that the input cell is transferred to the ATM switch. At step S46, the input cell controller 50 increases the cell counter value A(N) by 1, and writes the increased cell counter value A(N) into the corresponding storage area of the cell counter memory 45.

In order to further describe the operation of the third embodiment of the present invention, the following conditions are defined. First, the apparatus shown in FIG. 16 has four VCIs (in actuality, 64 k virtual channels are provided). Second, the periodic subtraction counter 44 has a period during which two cells can pass. The period of the periodic subtraction counter 44 corresponds to the interval between consecutive timer output signals which activate the count-up operation. Third, the tolerable value γ=2. Fourth, the initial virtual channel is "0". Fifth, cells are transferred via the input and output highways at predetermined intervals. Sixth, the subtraction multiplying factor B(N) is equal to the period of the periodic subtraction counter 44, that is, "1". At time t0 shown in FIG. 20, the apparatus is initialized and the control procedure shown in FIG. 19 starts from time t1.

Figure 20:
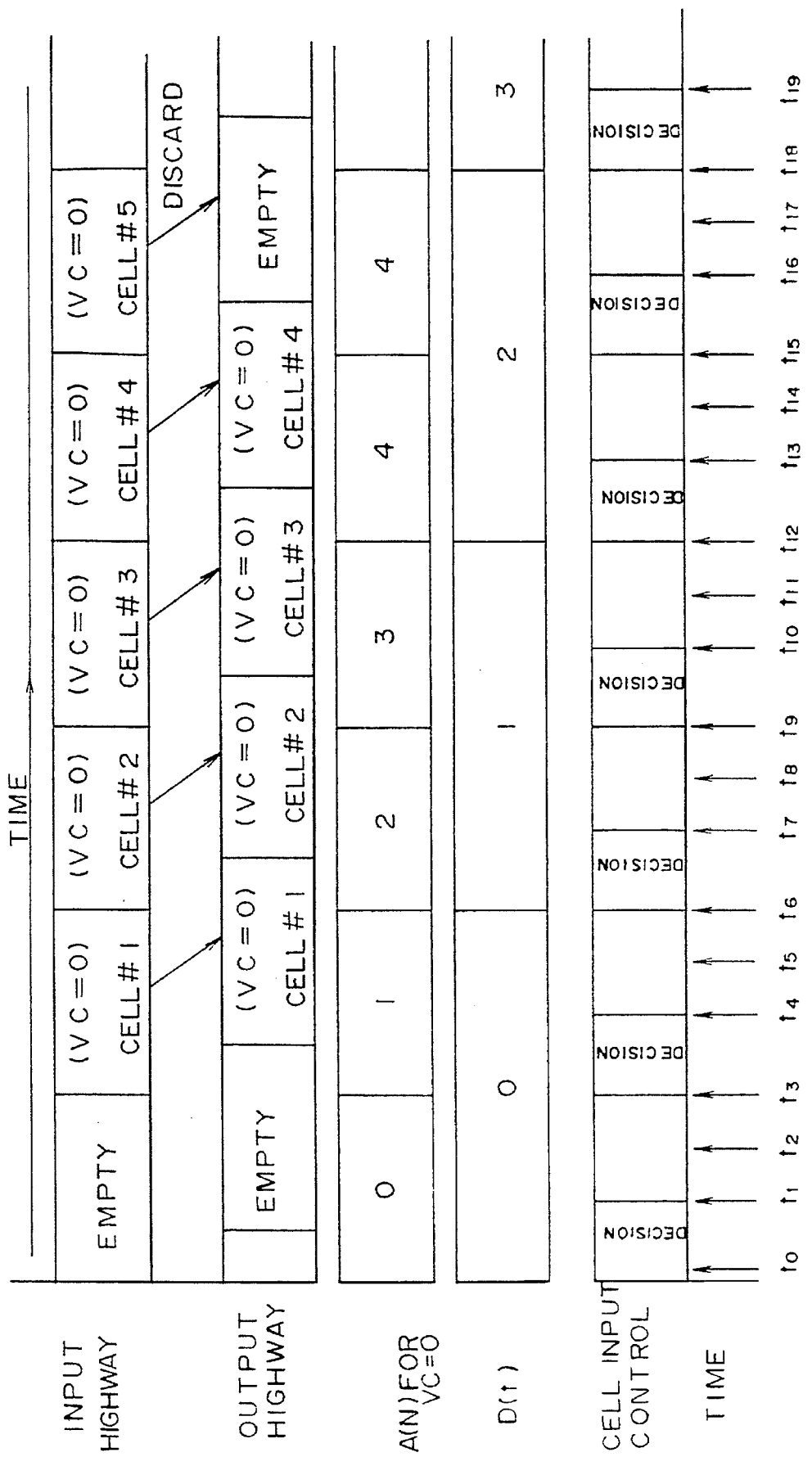
FIG. 20 is a timing chart of the operation of the third embodiment of the present invention shown in FIG. 16.

Referring to FIG. 20, at time t3, cell #1 (VCI=0) is input to the delay unit 20 and the cell input controller 50. The input cell controller 50 reads out the cell counter value A(0) from the cell counter memory 45 and the subtraction multiplying factor C(0) from the subtraction memory 48. In this case, the cell counter value is 0, and thus cell #1 is output to the ATM switch. The cell counter value A(0) is increased by 1 (A(0)=1) and written into the corresponding storage area of the cell counter memory 45. In the same manner, cells #2, #3 and #4 are processed.

As shown in FIG. 20, the periodic subtraction counter 44 increases its counter value by 1 at the interval during which two cells pass. At time t15, cell #5 is input to the delay unit 20 and the cell input controller 50. At time t15, the cell counter value A(0) is 4 and the periodic subtraction counter 44 indicates 2. Thus, 4−2×1=2, which coincides the tolerable value γ equal to 2. Thus, it is determined that the cell #5 should be discarded. If the subtraction multiplying factor C(0) is equal to 2 (twice the period of the periodic subtraction counter 44), 4−2×2=0, and the input cell controller 50 passes the cell #5.

The present invention is not limited to the specifically disclosed embodiments, and variations and modifications may be made without departing from the scope of the present invention.

What is claimed is:

1. An apparatus using operation values, for controlling cells which are to be input to an ATM switch, said apparatus comprising:

buffer means for storing a cell directed to the ATM switch;

first memory means for storing, for each of different calls, the number of cells which have been received in the ATM switch until each of the different calls is terminated after each of the different calls is generated;

calculation means, coupled to said first memory means, including a second memory means for storing counter values, for calculating a modified number of cells from the number of cells for each of the different calls and a corresponding one of the counter values, the counter values periodically changing by respective operation values;

control means, coupled to said calculation means, for determining whether the cell stored in said buffer means should be output to the ATM switch or discarded by referring to the modified number of cells calculated by said calculation means and related to the cell stored in said buffer means, to generate a result;

empty cell pattern generating means for generating an empty cell pattern: and select means, coupled to said buffer means and said empty cell pattern generating means, for selecting either the cell stored in said buffer means or the empty cell pattern generated by said empty cell pattern generating means, based on the result generated by said control means.

2. An apparatus as claimed in claim 1, wherein said control means includes means for comparing the number of cells related to the cell stored in said buffer means with a threshold value, to generate the result.

3. An apparatus as claimed in claim 1, wherein said calculation means includes means for subtracting the operation values from respective numbers of cells for each of the different calls.

4. An apparatus as claimed in claim 1, wherein said control means includes means for discarding the cell stored in said buffer means when the number of cells related to the cell is equal to or greater than a threshold value.

5. An apparatus as claimed in claim 1, wherein said operation values are equal to 1.

6. An apparatus as claimed in claim 1, wherein said operation values are greater than 1.

7. An apparatus as claimed in claim 1, said apparatus further comprising:

third memory means for storing predetermined values respectively related to the different calls and wherein said control means includes means for reading out, from said third memory means, one of the predetermined values related to the cell stored in said buffer means and for outputting, as one of said operation values, said one of the predetermined values to said calculation means.

8. An apparatus as claimed in claim 7, wherein said control means includes correction means for correcting said one of the predetermined values which is related to the cell stored in said buffer means, based on a calculation period of said calculation means, a previous calculation time at which the calculation means changes the number of cells related to one of the calls, and a current time.

9. An apparatus as claimed in claim 8, wherein said correction means includes means for correcting said one of the predetermined values based on a value obtained by dividing a difference between the current time and the previous calculation time by the calculation period.

10. An apparatus as claimed in claim 8, wherein said control means includes first means for subtracting a corrected one of the predetermined values generated by said correction means from the number of cells stored in the first memory means and related to the cell stored in said buffer means, to generate a subtraction result, and second means for comparing the subtraction result output by said first means with a threshold value and for generating the result indicating whether the input cell stored in said buffer means should be output to the ATM switch or discarded based on the comparison.

11. An apparatus as claimed in claim 1, wherein said calculation means includes means for generating counter values which periodically increase by respective predetermined counter values, and wherein said counter values correspond to said respective operation values.

12. An apparatus as claimed in claim 1, further comprising:

third memory means for storing factors respectively related to the different calls, wherein said periodic calculation means includes means for generating counter values which periodically increase by respective predetermined counter values, and wherein said control means includes first means for reading out, from said third memory means, one of the factors related to the cell stored in said buffer means, second means for executing a predetermined operation on one of the counter values related to the cell stored in the buffer means, and said one of the factors, and for subtracting a result of said predetermined operation from the number of cells which is stored in said first memory means and related to the cell stored in said buffer means, to generate the result, and third means for determining whether the cell stored in said buffer means should be output to the ATM switch or discarded based on the result of subtraction executed by said second means of said control means.

13. An apparatus as claimed in claim 12, wherein said predetermined operation is a multiplying operation.

14. An apparatus as claimed in claim 1, further comprising:

means for reading out the number of cells for each of the calls stored in said first memory means in order to calculate a charge for each of the calls.

15. A method for controlling cells which are to be input to an ATM switch, said method comprising the steps of:

(a) storing a cell directed to the ATM switch in a buffer memory;

(b) storing in a first memory, for each of different calls, the number of cells which have been received in the ATM switch until each of the different calls is terminated after each of the different calls is generated;

(c) storing counter values;

(d) calculating a modified number of cells from the number of cells for each of the different calls and a corresponding one of the counter values, the counter values periodically changing by respective operation values;

(e) determining whether the cell stored in said buffer memory should be output to the ATM switch or discarded by referring to the modified number of cells calculated in step (d) and related to the cell stored in said buffer memory;

(f) generating an empty cell pattern: and (g) selecting either the cell stored in said buffer memory or the empty cell pattern, based on said step (e).

16. A method as claimed in claim 15, wherein said step (d) comprises the substeps of:

d1) comparing the number of cells related to the cell stored in said buffer memory with a threshold value, to generate the result, and d2) determining whether the cell stored in said buffer memory should be output to the ATM switch or discarded, based on the result.

17. A method as claimed in claim 15, wherein said step (d) includes the substep of subtracting the respective operation values from the respective numbers of cells for each of the different calls.

18. A method as claimed in claim 15, wherein said step (e) includes the substep of discarding the cell stored in said buffer memory when the number of cells related to the cell is equal to or greater than a threshold value.

19. A method as claimed in claim 15, wherein said operation values are equal to 1.

20. A method as claimed in claim 15, wherein said operation values are greater than 1.

21. A method as claimed in claim 15, further comprising the step of storing predetermined values respectively related to the different calls in a second memory, and wherein said step (d) includes the substep of reading out, from said second memory, one of the predetermined values related to the cell stored in said buffer memory, said one of the predetermined values corresponding to a respective one of said operation values.

22. A method as claimed in claim 21, wherein said step (d) includes the substep of correcting said one of the predetermined values which is related to the cell stored in said buffer memory based on a calculation period of said step (d), a previous calculation time at which said step (d) changes the number of cells related to one of the calls, and a current time.

23. A method as claimed in claim 22, wherein said step (d) includes the substep of correcting said one of the predetermined values based on a value obtained by dividing a difference between the current time and the previous calculation time by the calculation period.

24. A method as claimed in claim 22, wherein said step (e) includes the substeps of e1) subtracting a corrected one of the predetermined values from the number of cells related to the cell stored in said buffer memory;

e2) comparing a result of subtraction output by said substep (e1) with a threshold value, to generate the result; and e3) determining whether the input cell stored in said buffer memory should be output to the ATM switch or discarded, based on the result of said substep (e2).

25. A method as claimed in claim 15, wherein said step (d) includes the substep of generating counter values which periodically increase by respective predetermined counter values, and wherein said counter values correspond to said operation values.

26. A method as claimed in claim 15, further comprising the step of storing factors respectively related to the different calls in a second memory, and wherein said step (c) includes the substep of generating counter values which periodically increase by respective predetermined counter values, and wherein said step (e) includes the substeps of:

e1) reading out, from said second memory, one of the factors related to the cell stored in said buffer memory;

e2) executing a predetermined operation on the counter value and said one of the factors and for subtracting a result of said predetermined operation from the number of cells which is stored in said first memory and related to the cell stored in said buffer memory, to generate the result; and e3) determining whether the cell stored in said buffer memory should be output to the ATM switch or discarded, based on the result.

27. A method as claimed in claim 26, wherein said predetermined operation is a multiplying operation.

28. A method as claimed in claim 15, further comprising the step of reading out the number of cells for each of the calls stored in said first memory in order to calculate a charge for each of the calls.

29. An apparatus for controlling cells which are to be input to an ATM switch, said apparatus comprising:

buffer means for storing a cell directed to the ATM switch;

first memory means for storing, for each of different calls, the number of cells which have been received in the ATM switch until each of the different calls is terminated after each of the different calls is generated;

periodic counter means for providing counter values respectively related to the different calls, said counter values periodically changing by respective operation values;

control means, coupled to said first memory means, for generating a result indicating, each time a cell is stored in the buffer means, whether the cell stored in said buffer means should be output to the ATM switch or discarded by referring to the number of cells which is stored in said first memory means and related to the cell stored in said buffer means and a corresponding one of the counter values;

empty cell pattern generating means for generating an empty cell pattern; and select means, coupled to said buffer means and said empty cell pattern generating means, for selecting either the cell stored in the buffer means or the empty cell pattern generated by said empty cell pattern generating means, based on the result generated by said control means.

30. An apparatus coupled to a network and to receive a data cell, comprising:

a buffer memory coupled to receive and store the data cell, and having an output;

a first memory to store numbers of cells received by the buffer memory for respective calls;

a second memory to store counter values for the respective calls;

a unit to periodically increment the counter values stored in the second memory, by respective operation values corresponding to the respective calls;

a controller coupled to the buffer memory, the first memory and the second memory, to obtain a result based on the number of cells and the counter value for the call relating to the data cell stored in the buffer memory and a predetermined value; and a selector coupled to the controller and the output of the buffer memory and the network, to selectively allow the data cell to pass from the output of the buffer memory to the network, based on the result.

31. An apparatus as claimed in claim 30, further comprising:

an empty cell generator coupled to the selector, to generate an empty cell, wherein the selector selectively allows one of the data cell and the empty cell to pass to the network, based on the result.

32. A method comprising the step of:

(a) storing in a first memory, numbers of data cells received for respective calls;

(b) storing in a second memory, counter values for the respective calls;

(c) periodically incrementing the counter values by respective operation values;

(d) subtracting the counter value for a particular call, from the number of data cells for the particular call, to generate a first result, upon arrival of a data cell associated with the particular call;

(e) comparing the first result with a predetermined value, to generate a second result; and (f) selectively sending the data cell to a network, based on the second result.

33. A method comprising the steps of:

(a) receiving data cells for a call;

(b) accumulating a number of the data cells received for the call in step (a);

(c) periodically obtaining a result by subtracting a periodically changed amount from the number of data cells; and (d) selectively sending the data cells for the call to a network, based on the result obtained in step (c).

* * * * *

UNITED STATES PATENT AND TRADEMARK OFFICE
CERTIFICATE OF CORRECTION

PATENT NO. : 5,509,001
DATED : April 16, 1996
INVENTOR(S) : Tachibana et al.

It is certified that error appears in the above-indentified patent and that said Letters Patent is hereby corrected as shown below:

Col. 1, line 9, "Sept. 19, 1993," should be --Sept. 13, 1993,--.

Col. 6, line 49, "34 and 34" should be --34 and 35--.

Col. 7, line 42, "by" should be deleted.

Col. 9, line 40, "the" (second occurrence) should be deleted.

Col. 10, line 54, "to" should be --t0--.

Col. 11, line 62, "calls" should be --calls,--.

Signed and Sealed this

Eighth Day of October, 1996

*Attest:*

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO.  : 5,509,001
DATED       : April 16, 1996
INVENTOR(S) : Tachibana, et al It is certified that error appears in the above-indentified patent and that said Letters Patent is hereby corrected as shown below:

Title page,   after item [22] insert:

--[30] Foreign Application Priority Data
       October 19, 1990 [JP] Japan........2-280882--.

Signed and Sealed this

Twentieth Day of May, 1997

*Attest:*

BRUCE LEHMAN

*Attesting Officer*   Commissioner of Patents and Trademarks